United States Patent
Andoh et al.

(10) Patent No.: US 7,699,984 B2
(45) Date of Patent: Apr. 20, 2010

(54) HYDRODYNAMIC TREATMENT DEVICE

(75) Inventors: Robert Yaw Gyamfi Andoh, Mitcham (GB); Michael Guy Faram, Bristol (GB)

(73) Assignee: Hydro International PLC, Clevedon (GB)

( * ) Notice: Subject to any disclaimer, the term of this patent is extended or adjusted under 35 U.S.C. 154(b) by 657 days.

(21) Appl. No.: 10/562,681

(22) PCT Filed: Jun. 28, 2004

(86) PCT No.: PCT/GB2004/002773

§ 371 (c)(1), (2), (4) Date: Aug. 21, 2006

(87) PCT Pub. No.: WO2005/000444

PCT Pub. Date: Jan. 6, 2005

(65) Prior Publication Data

US 2007/0108122 A1   May 17, 2007

(30) Foreign Application Priority Data

Jun. 27, 2003  (GB)  ................................. 0315223.8

(51) Int. Cl.
*B01D 21/00* (2006.01)

(52) U.S. Cl. .................... 210/304; 210/295; 210/512.1; 210/513; 210/532.1; 210/538

(58) Field of Classification Search .............. 210/512.1, 210/512.2, 513, 532.1, 538, 295, 304, 305, 210/313, 319, 170.03, 521; 95/271; 55/459.1, 55/460, 452

See application file for complete search history.

(56) References Cited

U.S. PATENT DOCUMENTS 1,761,627 A * 6/1930 Hine .......................... 209/135

(Continued)

FOREIGN PATENT DOCUMENTS

DE   10317772 A1 * 12/2004

(Continued)

OTHER PUBLICATIONS

Design, construction and performance of vortex overflows, Bernard Smisson, Symposium on Storm Sewage Overflows, Institution of Civil Engineers, 1967, pp. 99-110 (see p. 1 of specification).

*Primary Examiner*—Tony G Soohoo
*Assistant Examiner*—David C Mellon
(74) *Attorney, Agent, or Firm*—Stites & Harbison PLLC; Marvin Petry; Douglas E. Jackson

(57) ABSTRACT

A hydrodynamic treatment device comprises a vessel (2) within which is disposed an inner partition (24). The inner partition (24) divides the interior of the vessel (2) into outer and inner regions (22, 28). Flow enters the vessel (2) through a tangentially oriented inlet (14) and establishes a complex circulating flow within the vessel (2). Settleable solids migrate to the bottom of the vessel (2) and are deposited in a sump (20) through a solids outlet opening (18). Flow enters the inner region (28) through apertures (34) in the inner partition (24), and is discharged through an outlet duct (8). The inner region (28) is closed at its lower end by a frusto-conical, downwardly diverging lower wall (30) which projects outwardly from a central cylindrical wall (26).

21 Claims, 4 Drawing Sheets

U.S. PATENT DOCUMENTS

| | | | |
|---|---|---|---|
| 3,784,009 A * | 1/1974 | Maciula | 210/114 |
| 4,271,019 A * | 6/1981 | Galletti | 210/108 |
| 4,298,465 A * | 11/1981 | Druffel | 210/304 |
| 4,406,789 A | 9/1983 | Brignon | |
| 4,451,366 A | 5/1984 | Smisson | |
| 4,865,751 A | 9/1989 | Smisson | |
| 4,983,295 A * | 1/1991 | Lamb et al. | 210/521 |
| 5,116,516 A * | 5/1992 | Smisson | 210/747 |
| 5,188,238 A * | 2/1993 | Smisson et al. | 209/725 |
| 5,531,888 A | 7/1996 | Geiger et al. | |
| 5,698,099 A | 12/1997 | Fagan et al. | |
| 6,730,222 B1 | 5/2004 | Andoh et al. | |
| 6,919,033 B2 * | 7/2005 | Stark et al. | 210/787 |
| 6,951,619 B2 * | 10/2005 | Bryant | 210/788 |
| 7,182,874 B2 * | 2/2007 | Allard et al. | 210/788 |
| 7,238,281 B2 * | 7/2007 | Su et al. | 210/170.03 |
| 7,422,683 B2 * | 9/2008 | Park | 210/170.03 |
| 7,527,731 B2 * | 5/2009 | Su et al. | 210/170.03 |

FOREIGN PATENT DOCUMENTS

| | | |
|---|---|---|
| SU | 1294384 | 3/1987 |
| WO | WO 00/62888 | * 10/2000 |

* cited by examiner

HYDRODYNAMIC TREATMENT DEVICE

FIELD OF THE INVENTION

This invention relates to a hydrodynamic treatment device for separating material from a liquid flow which carries the material.

BACKGROUND OF THE INVENTION

The material to be separated may be settleable solids such as grit, sediments and fine particulates, or liquids having a lower density than the main liquid flow (which may be oils and hydrocarbons if the main liquid is water), or gross solids that may be neutrally buoyant, such as street debris including bottles, crisp packets, cigarette ends, leaves, etc.

Hydrodynamic treatment vessels or vortex separators are well known and are based on initial research work carried out in the 1950's and 1960's (Design, Construction and performance of vortex overflows, Bernard Smisson, Symposium on Storm Sewage Overflows, Institution of Civil Engineers, 1967, pages 99-110). They have found application as combined sewer overflows (CSOs) and as grit separators.

Separators known as "Hydro-Dynamic" separators are low energy devices which operate by causing a liquid containing suspended solid material to rotate in a cylindrical vessel so that the solid material falls under gravity and inertial forces to the base and once there is swept to a central lower outlet by an inward sweeping effect caused by complex flow patterns in the device. It is known that the device is suitable for providing enhanced settlement of solids material from a liquid/solid mixture. Thus, such devices have been used in sewage treatment for separating hard grit from the incoming raw sewage, with the resultant degritted sewage then being passed to a conventional sewage treatment plant. They are also used as "storm water overflows" upstream of conventional sewage treatment works to ensure that gross contamination is separated from liquid waste discharged to watercourses during storm conditions when the sewage treatment works is unable to cope with the high flow. "Hydro-Dynamic" separators of this type are described and claimed in, for instance, our British Patent Specifications Nos. 2082941 (corresponding to U.S. Pat. No. 4,451,366) and 2158741 (corresponding to U.S. Pat. No. 4,747,962).

The known hydro-dynamic separator is a simple device with no moving parts. The simple geometry of the device however, hides an internal complexity of flow structure. The mean flow pattern observed is a downward helical flow in the outer region and an upward helical flow near the central region of the separator. These two spiral flow regimes are separated by a shear zone region. The combination of underflow and overflow leads to a non-uniform axial flow profile. The effects of fluid viscosity, boundary layers and momentum transfer between adjacent zones of flow moving at different velocities, cause velocity gradients and vorticity (rotation) to be present. These result in a secondary flow, superimposed on the primary flow, which in turn results in solids being swept towards a lower outlet, and thence to a solids collection trough or hopper. The hydraulic regime in the separator ensures very little short-circuiting with a near plug-flow type flow regime.

The effectiveness of a hydrodynamic separator can be expressed quantitatively in terms of removal efficiency and retention efficiency. Removal efficiency represents the percentage of particles in the incoming flow which are removed from within the separator. Retention efficiency represents the percentage of particles or other contaminants in the incoming flow which are retained within the device and do not reach the clean water outlet. Both the removal efficiency and retention efficiency will vary according to the characteristics of particle concerned, such as its size, density and shape, but the objective is to maximise the percentage of particles either removed from the flow or retained within the treatment device, particularly for smaller particle sizes, such as those below 400 microns.

Optimising the performance of hydrodynamic separators is extremely difficult. Small changes in geometry can have major effects on removal and retention efficiencies, and consequently the optimisation process requires the construction of many prototypes. This is both expensive and time consuming, and does not lead to a guaranteed improvement in performance.

Computational fluid dynamics enables computer modelling of treatment vessels, and of the flow regimes which are created within them. However, the complex nature of the flow and, as mentioned above, the effect on performance of small changes in geometry mean that even computational fluid dynamics is not completely reliable in optimising the performance of hydrodynamic treatment devices in a practical environment.

A development of the separators disclosed in GB 2082941 and GB 2158741 is disclosed in WO00/62888. The separator disclosed in that document comprises a cylindrical vessel containing a hollow column which terminates at its lower end at a downwardly diverging conical member. Shortly above the conical member, the hollow column has openings which permit flow from the main body of the vessel into the column. There is an outlet for such flow at the top of the column.

A dip plate surrounds the column, and acts to stabilise flow patterns within the vessel. In operation, flow can take place around the dip plate to the openings in the column, and thence up the column to the outlet.

The present invention arises from a desire to increase the removal and retention efficiencies of separators of the type disclosed in GB 2082941, GB 2158741 and WO00/62888.

BRIEF SUMMARY OF THE INVENTION

According to the present invention there is provided a hydrodynamic treatment device for separating material from a liquid flow, the device comprising a vessel having a cylindrical outer wall and an inner partition which divides the interior of the vessel into outer and inner separation regions which communicate with each other across the inner partition, the vessel having an inlet which is directed into one of the inner and outer regions to promote a rotating flow in the vessel, a liquid outlet which extends from the other of the inner and outer regions, and a frustoconical base which converges downwardly to an outlet opening for separated material, the inner separation region being closed at its lower end.

One result of adopting the features of the present invention is that flow patterns established in the inner separation region are not propagated through the outlet opening to a separated material collection region. In known devices, such flow patterns can stir up collected material, and cause it to migrate back through the outlet opening to rejoin the main flow.

Preferred embodiments constructed in accordance with the present invention demonstrate excellent removal and retention efficiencies.

In a preferred embodiment, the inlet opens into the outer separation region and the outlet opens into the inner separation region, although the reverse arrangement is possible.

The inner separation region may be annular, with its inner periphery defined by a central cylindrical partition, the interior of which is open at its lower end to provide access to the outlet opening.

Communication between the outer and inner separation regions may be provided by means of at least one aperture in the inner partition. The or each aperture may be disposed adjacent the lower end of the inner partition.

A screen may be provided over the or each aperture. In one embodiment, the aperture may comprise a circumferential slot extending entirely around the inner partition.

A frusto-conical downwardly extending wall may be provided at the lower end of the inner separation region. The inner partition may abut the frusto-conical wall, so that the frusto-conical wall serves to close the lower end of the inner separation region. The frusto-conical wall preferably projects beyond the inner partition, the outer edge of the frusto-conical wall being spaced from the frusto-conical base of the vessel, so as to define a gap providing communication between the interior of the vessel and the outlet opening.

The inner partition may be cylindrical, and may be coaxial with the outer wall.

In a preferred embodiment, an outlet duct extends from the inner separation region through the cylindrical outer wall of the vessel. An inlet duct may be provided to conduct flow to the inlet, and this inlet duct may extend through the cylindrical outer wall. The inlet and outlet ducts may be aligned with one another and may be provided in an upper region of the vessel. Alternatively, the inlet may be supplied with inflowing liquid from an overhead grating, for example situated to receive run-off from a road surface.

The inlet may be in the form of an inlet port which communicates with the inlet duct, which is situated below the inlet duct, and which opens in a generally tangential direction with respect to the axis of the vessel. The inlet duct may also communicate directly with the inner separation region, for example over a weir having a top edge above the inlet port, or other bypass facility such as a siphon.

The inner separation region may contain filter media and, in a preferred embodiment, the filter media substantially fills the inner separation region. The filter media may be in the form of a replaceable cartridge.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF THE INVENTION

Figure 1:
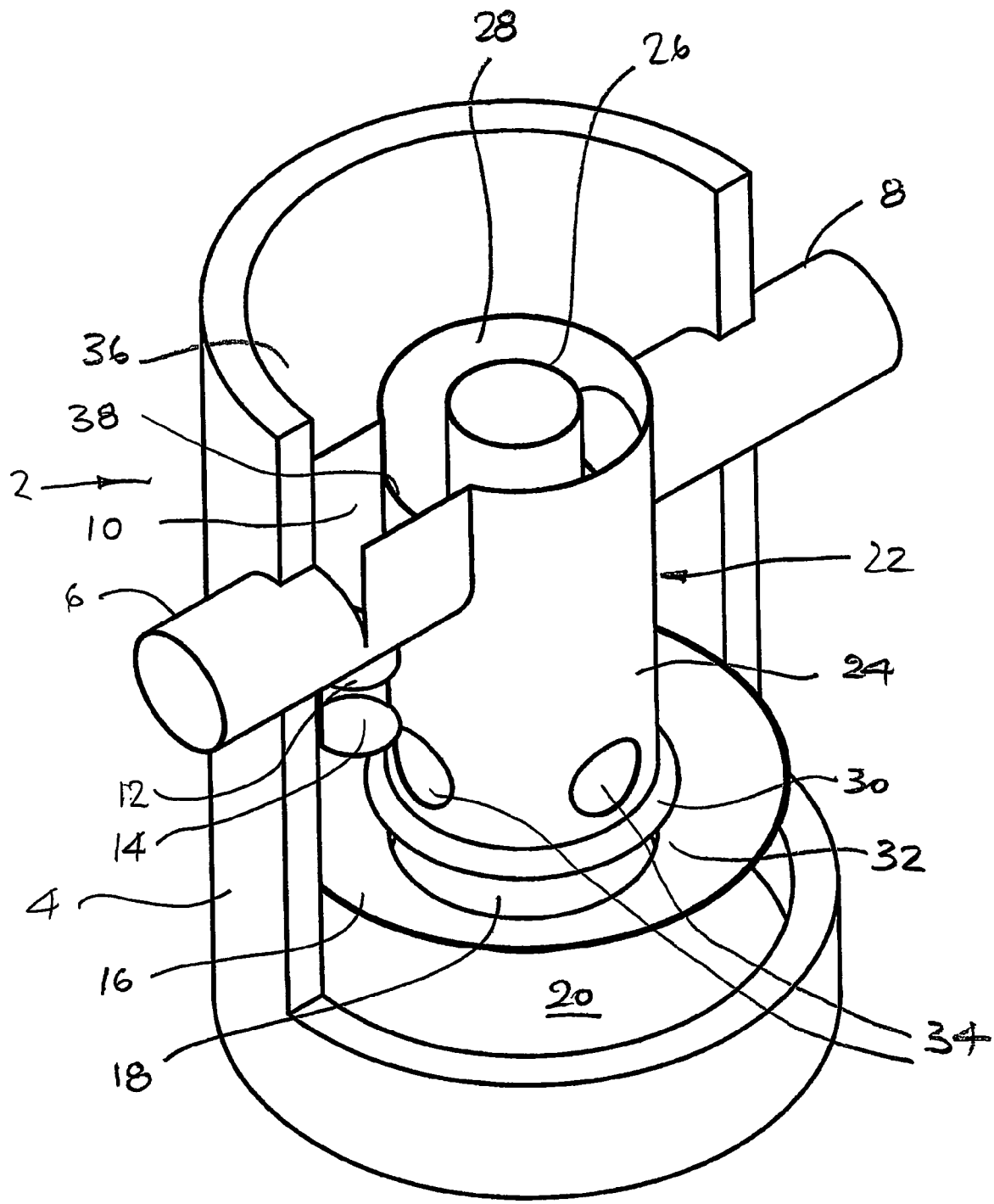
FIG. 1 shows a hydrodynamic treatment device with part omitted for clarity.

The treatment device of FIG. 1 comprises a vessel 2 defined by a cylindrical outer wall 4. An inlet duct 6 and an outlet duct 8 extend through the wall 4 and are aligned with each other. Within the vessel 2, the inlet duct 6 emerges into a chamber or trough 10. The base of the trough 10 opens into an inlet shute 12 which is situated adjacent the inner face of the wall 4. The shute 12 has an inlet port 14 in the form of an opening directed generally tangentially of the wall 4 for admitting flow to the interior of the vessel 2. The inlet port 14 is disposed below the trough 10 and the inlet duct 6.

At the lower end of the vessel, there is a downwardly convergent frusto-conical base 16 which extends from the wall 4 to a outlet opening 18 for separated material, which provides access to a sump 20 for collection of the material.

An inner partition 24 is situated within the vessel 2. In the embodiment illustrated, the inner partition 24 is cylindrical and is coaxial with the wall 4. However, in other embodiments the inner partition 24 may have a different shape and disposition. The partition 24 divides the interior of the vessel 2 into an outer separation region 22 and an inner separation region 28. The inner separation region 28 is annular, with its inner periphery defined by a central cylindrical partition 26.

The partitions 24, 26 defining the inner separation region 28 extend, in the embodiment shown in FIG. 1, for almost the full height of the vessel 2. At their upper ends, they extend above the inlet and outlet ducts 6, 8, and at their lower ends they extend to the level of the frusto-conical base 16, although they may terminate short of this position. The central cylindrical partition 26 is continuous, i.e. it contains no apertures or perforations.

Figure 2:
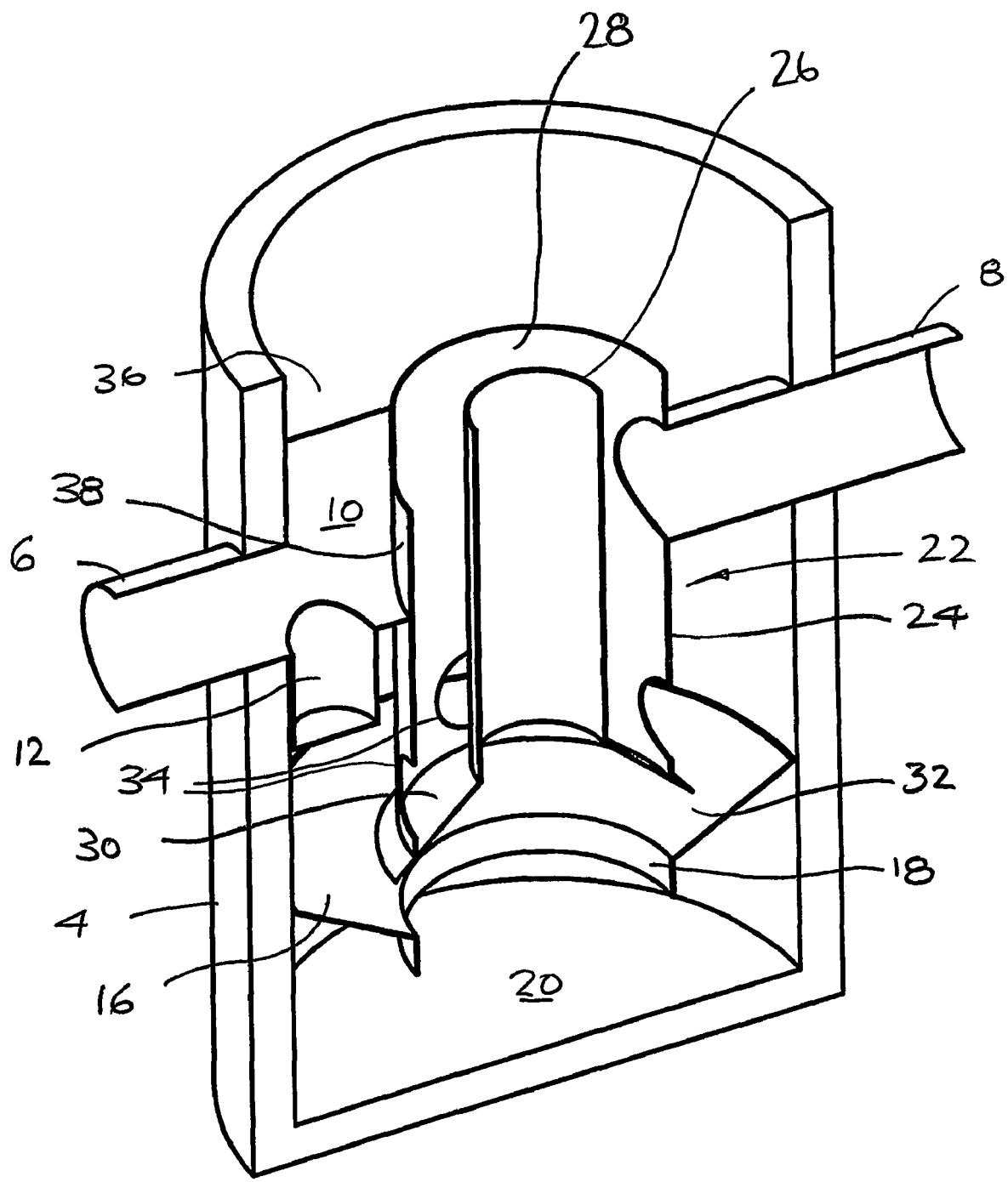
FIG. 2 is a sectional view of the treatment device of FIG. 1.

The central cylindrical partition 26 is provided at its lower end with a downwardly divergent frusto-conical wall 30. The inner partition 24 abuts the frusto-conical wall 30, and it will be appreciated from FIG. 2 that the frusto-conical wall 30 thus closes the lower end of the inner separation region 28.

The frusto-conical wall 30 extends outwardly beyond the inner partition 24 and stops short of the frusto-conical base 16. An annular gap 32 is thus left between the frusto-conical base 16 and the frusto-conical wall 30 to provide communication with the outer separation region 22 and the outlet opening 18.

Apertures 34 are provided in the inner partition 24 adjacent its lower end. In the embodiment shown, there are four such apertures distributed equally around the inner partition 24. The apertures 34 may be provided with screens such as mesh screens. In alternative embodiments, the apertures may be replaced by a single slot extending circumferentially around the inner partition 24, or defined by a gap between the lower edge of the inner partition 24 and the frusto-conical wall 30. Such a slot may also be provided with a screen.

The outlet duct 8 opens at the inner partition 24 to permit flow from the inner separation region 28 into the outlet duct 8.

In operation, incoming flow, for example water containing contaminants to be separated, such as settleable solids material and floatable material, enters the vessel 2 by way of the inlet duct 6. The flow passes through the trough 10 into the shute 12 and thence through the inlet 14 to establish a rotating flow within the vessel. Complex flow patterns are set up within the liquid within the vessel, and this enables solids and other settleable material to settle and eventually to pass through the gap 32 and the outlet opening 18 into the sump 20. Floatable material, such as oil and hydrocarbons as well as solids with a density lower than water, will similarly be separated from the flow and will rise within the vessel to accumulate in the upper region 36.

Clean water, ie water from which most settleable solids and floatable materials have been separated, will pass through the apertures 34 into the inner separation region 28. If screens are provided over the apertures 34, these will provide additional removal of solids before the flow enters the inner separation region 28. Additional settling may occur within the inner separation region 28. Solid material settling in this region will accumulate on the wall 30 and possibly pass back through the apertures 34 to migrate to the outlet opening 18.

Liquid flow from the inner separation region will then pass through the outlet duct 8 for discharge or further treatment. Floatable materials collected in the region 36 can be removed periodically, as can settled material accumulated in the sump 20. It will be appreciated that access to the sump 20 can be achieved through the interior of the central cylindrical wall 26 and through the outlet opening 18.

Figure 4:
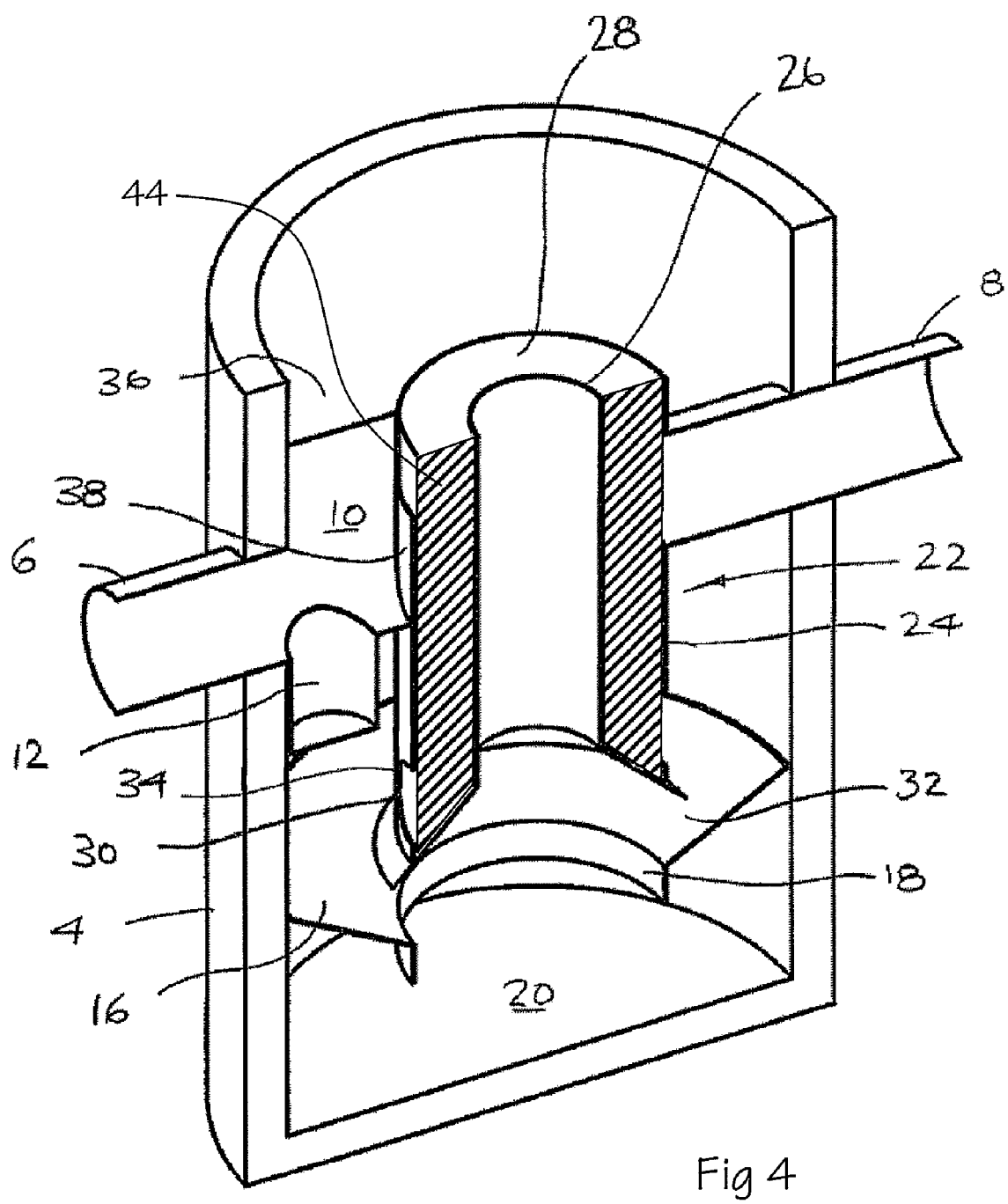
FIG. 4 corresponds to FIG. 2 but shows a filter media.

Filter media 44 may be provided in the inner separation region 28 as shown in FIG. 4. This filter media 44 may substantially fill the region 28 and will serve to extract further solids from the flow before it reaches the outlet duct 8. For ease of maintenance, the filter media 44 may be in the form of, or contained in, a cartridge so that periodic replacement is simplified.

In the event of heavy flow, in excess of that which can pass through the shute 12 and the inlet port 14, the level in the trough 10 will rise. The trough is bounded at its end away from the inlet duct 6 by a weir 38, the top edge of which is substantially above the inlet 14. When the level in the trough 10 reaches the top edge of the weir 38, flow will bypass the inlet 14 and pass over the weir 38 directly to the inner separation region 28 and thence to the outlet duct 8. It will be appreciated that rapidly settling solids will tend to move along the lower region of the trough 10 and so will not flow over the weir 38 but instead will pass into the vessel 2 through the inlet 14. Some solids which pass over the weir 38 will have a settling rate in excess of the upflow rate of liquid in the inner separation region 28 and will fall to the bottom of the inner separation region 28 to emerge from the apertures 34 into the main flow in the vessel 2.

Figure 3:
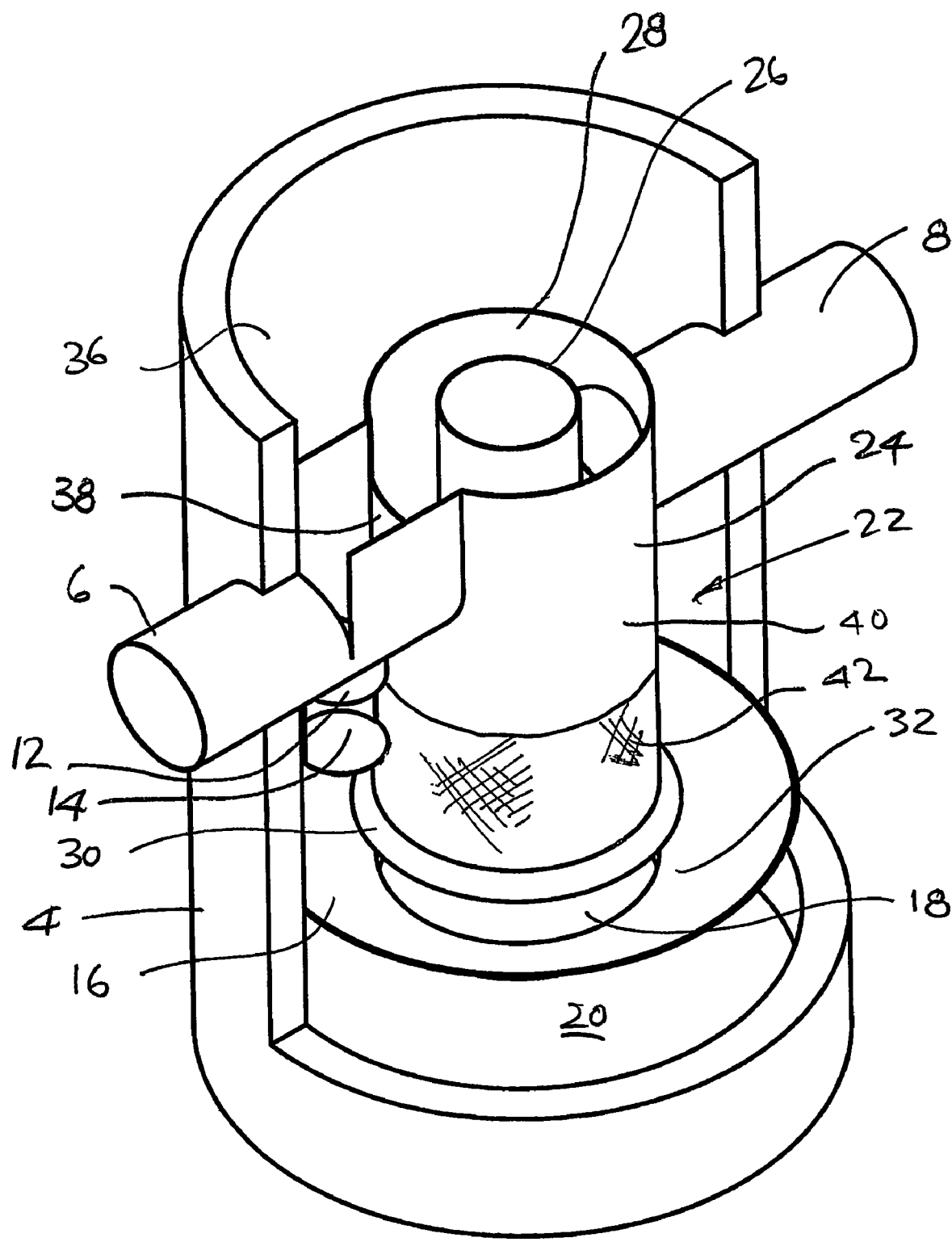
FIG. 3 corresponds to FIG. 1 but shows a modified device.

FIG. 3 shows a modified device in which there are no apertures 34. Instead, the inner partition 24 comprises an upper, continuous, portion 40 and a lower perforated portion 42. The portion 42 may comprise a cylinder of screening material, such as mesh, secured between the upper portion 40 and the frusto-conical wall 30. Alternatively, the portion 42 may be omitted, so that access to the inner separation region 28 is achieved by way of a circumferential slot between the portion 40 and the frusto-conical wall 30, or between two spaced apart continuous portions of the inner partition 24.

The invention claimed is:

1. A hydrodynamic treatment device for separating material from a liquid flow, the device comprising a vessel having:
   a cylindrical outer wall;
   an inner partition which divides the interior of the vessel into an outer separation region and an annular inner separation region, the outer and inner separation regions communicating with each other across the inner partition;
   an inlet which is directed into one of the inner and outer regions to promote a rotating flow in the vessel;
   a liquid outlet which extends from the other of the inner and outer regions; and
   a frustoconical base which converges downwardly to an outlet opening for separated material, which said outlet opening of the frustoconical base communicates with the outer separation region beneath the inner partition;
   a lower end wall closing a lower annular end of the annular inner separation region; and
   a central cylindrical partition defining an inner periphery of the inner separation region, the interior of which said central cylindrical partition has an open lower end through which access is directly provided to the outlet opening of the frustoconical base.

2. A hydrodynamic treatment device as claimed in claim 1, in which the inlet opens into the outer separation region and the outlet opens into the inner separation region.

3. A hydrodynamic treatment device as claimed in claim 1, in which the inner separation region communicates with the outer separation region through at least one aperture formed in the inner partition.

4. A hydrodynamic treatment device as claimed in claim 3, in which the or each aperture is disposed adjacent the lower end of the inner partition.

5. A hydrodynamic treatment device as claimed in claim 3, in which the aperture comprises a circumferential gap between the inner partition and a wall closing the lower end of the inner separation region.

6. A hydrodynamic treatment device as claimed in claim 3, in which the or each aperture is provided with a screen.

7. A hydrodynamic treatment device as claimed in claim 1, in which the lower end wall is frusto-conical and diverges in the downwards direction.

8. A hydrodynamic treatment device as claimed in claim 7, in which the frusto-conical lower end wall projects beyond the inner partition.

9. A hydrodynamic treatment device as claimed in claim 1, in which the lower end wall terminates short of the frusto-conical base of the vessel, thereby defining an annular gap between the frusto-conical base and the lower end wall.

10. A hydrodynamic treatment device as claimed in claim 1, in which a filter media is provided in the inner separation region.

11. A hydrodynamic treatment device as claimed in claim 10, in which the filter media substantially fills the inner separation region.

12. A hydrodynamic treatment device as claimed in claim 10, in which the filter media comprises a replaceable cartridge.

13. A hydrodynamic treatment device as claimed in claim 1, in which an outlet duct extends from the liquid outlet through the cylindrical outer wall of the vessel.

14. A hydrodynamic treatment device as claimed in claim 13, in which an inlet duct extends to the inlet of the vessel through the cylindrical outer wall of the vessel, the inlet duct being aligned with the outlet duct.

15. A hydrodynamic treatment device as claimed in claim 14, in which the inlet is disposed below the inlet duct and comprises an inlet port oriented to discharge inlet flow into the vessel in a tangential direction with respect to the axis of the cylindrical outer wall.

16. A hydrodynamic treatment device as claimed in claim 14, in which the inlet and outlet ducts are disposed at an upper region of the vessel.

17. A hydrodynamic treatment device as claimed in claim 14, in which the inlet duct communicates with the inlet through a chamber, the chamber being provided with bypass means for allowing flow from the chamber to the inner separation region, by passing the outer separation region.

18. A hydrodynamic treatment device as claimed in claim 17, in which the inlet port is provided in the wall of an inlet shute which extends downwardly from the chamber.

19. A hydrodynamic treatment device as claimed in claim 18, in which the bypass means comprises a weir disposed between the chamber and the inner separation region, the overflow edge of the weir being at a level higher than the inlet port.

20. A hydrodynamic separator as claimed in claim 1, in which the inner partition is cylindrical.

21. A hydrodynamic separator as claimed in claim 1, in which the inner partition is coaxial with the outer wall.

* * * * *